Oct. 6, 1953  M. LONG  2,654,207
COMBINE HAVING SIDE HILL PLATFORM ADJUSTMENTS
Filed Feb. 5, 1951  5 Sheets-Sheet 3
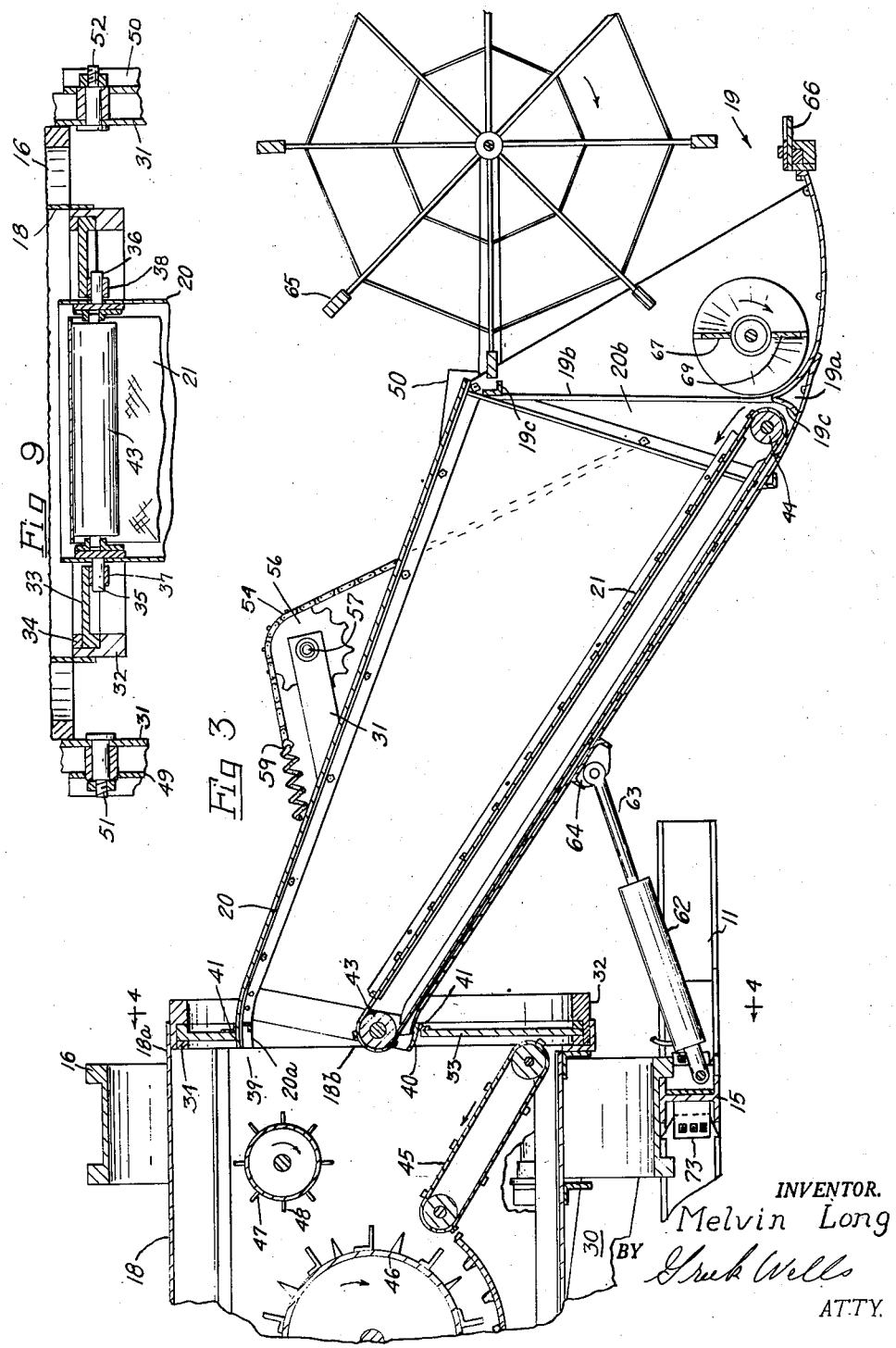
INVENTOR.
Melvin Long
BY
ATTY.

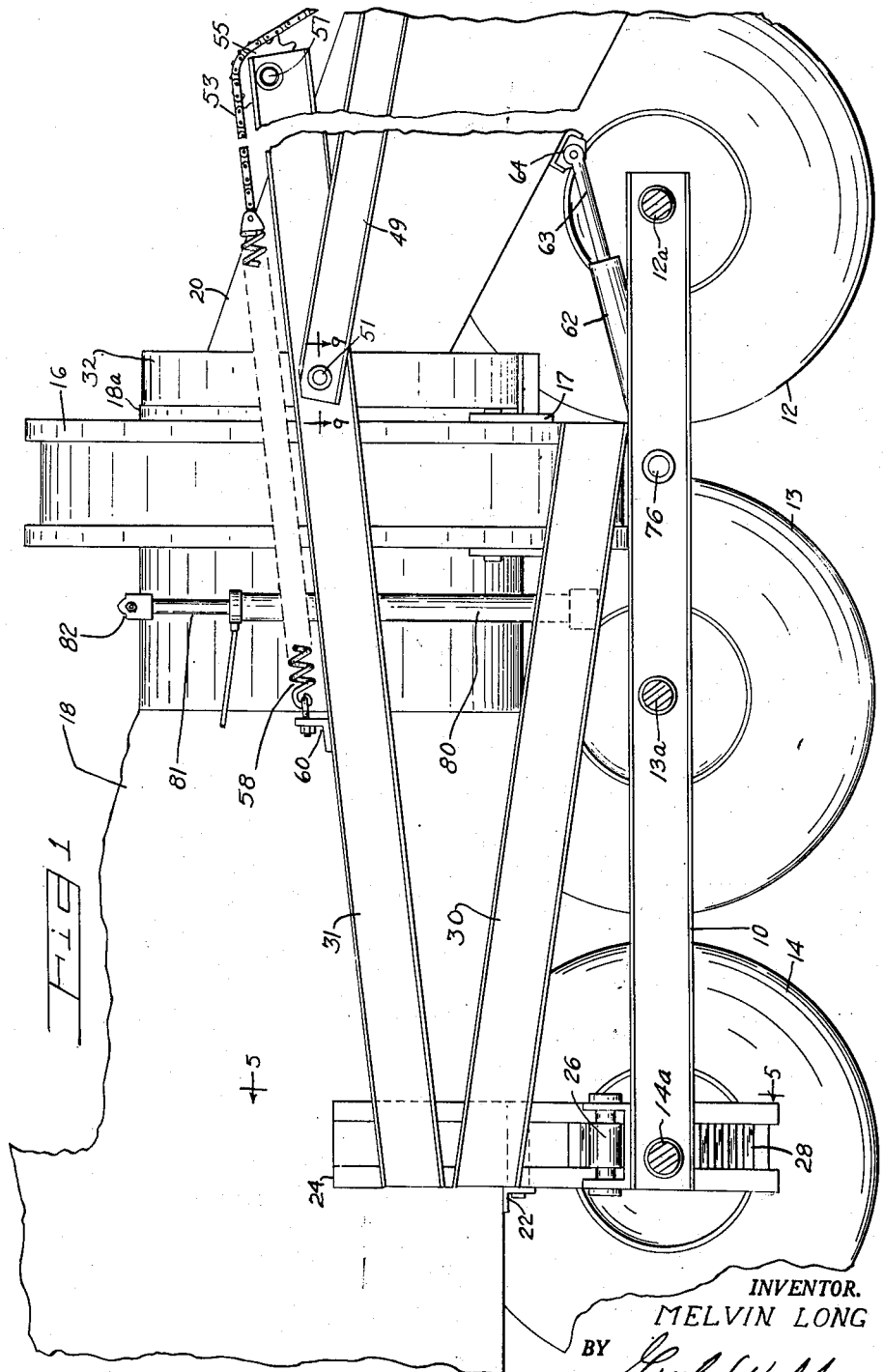

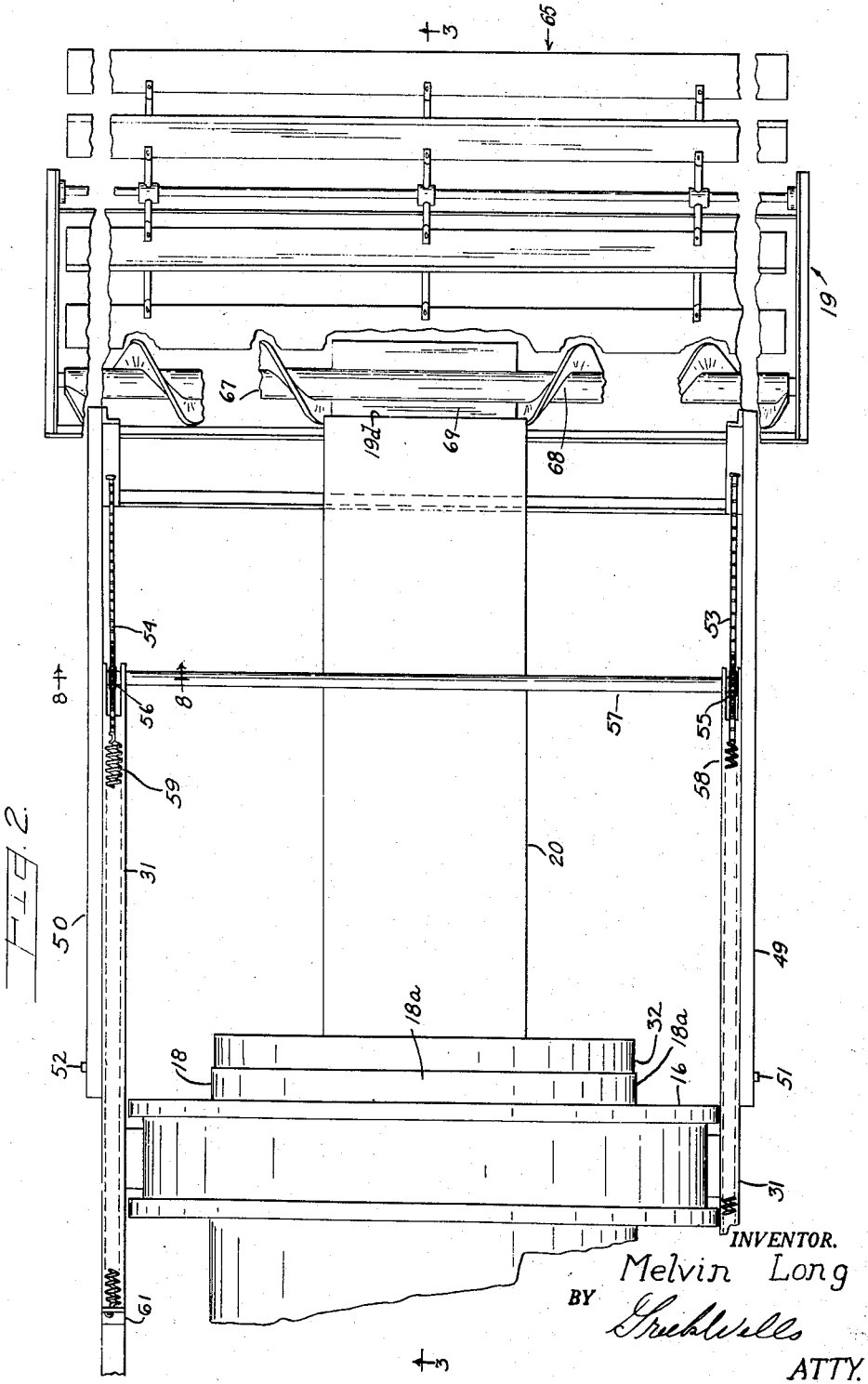

Oct. 6, 1953 — M. LONG — 2,654,207
COMBINE HAVING SIDE HILL PLATFORM ADJUSTMENTS
Filed Feb. 5, 1951 — 5 Sheets-Sheet 4
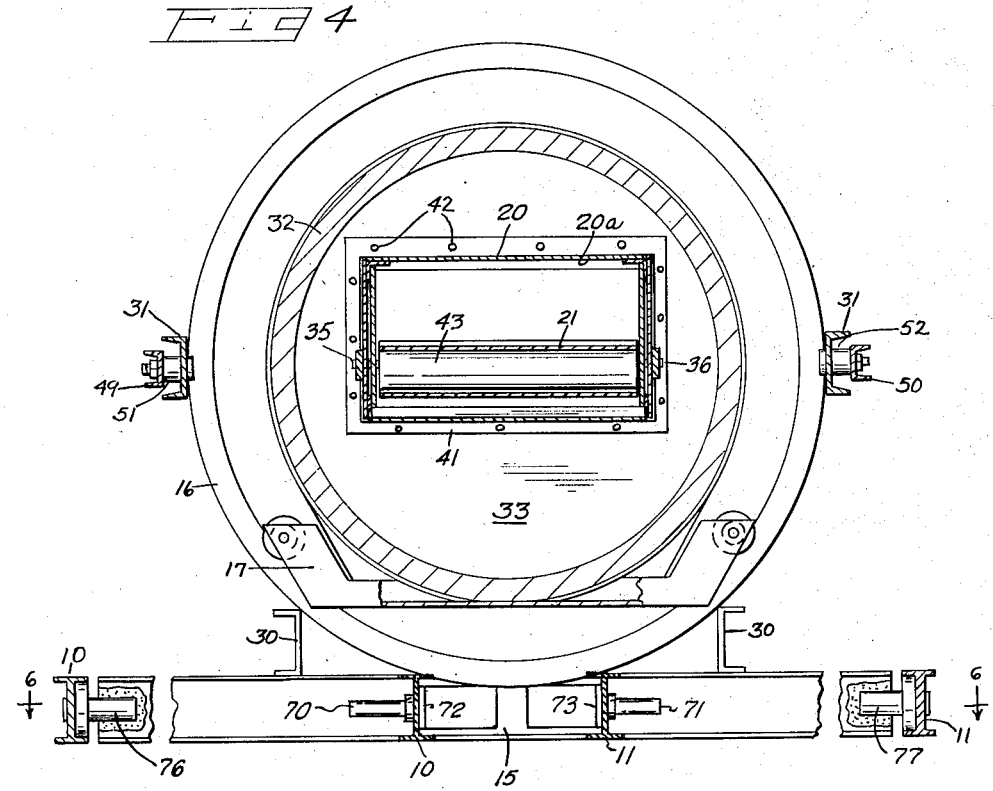
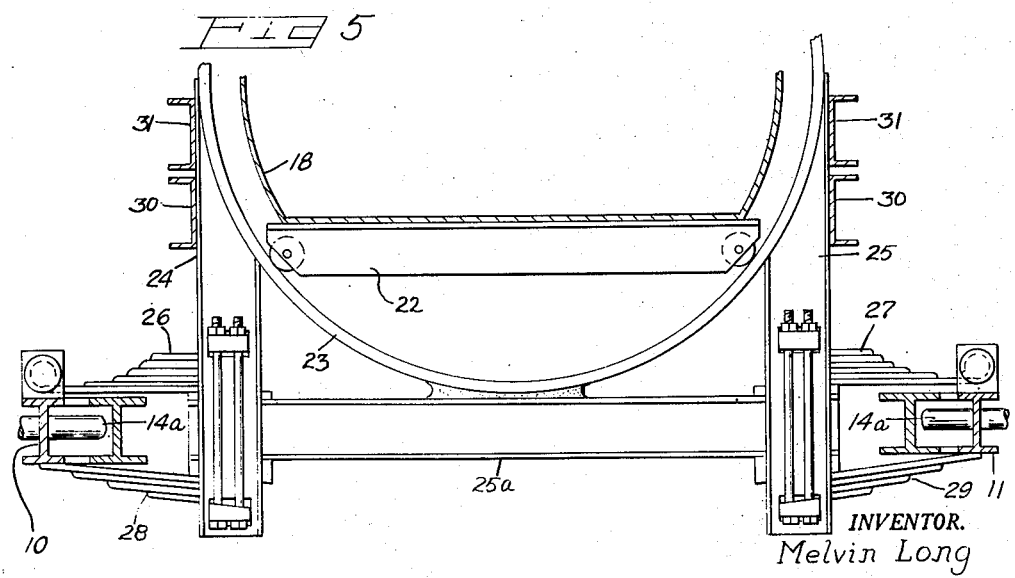
INVENTOR.
Melvin Long
BY
ATTY.

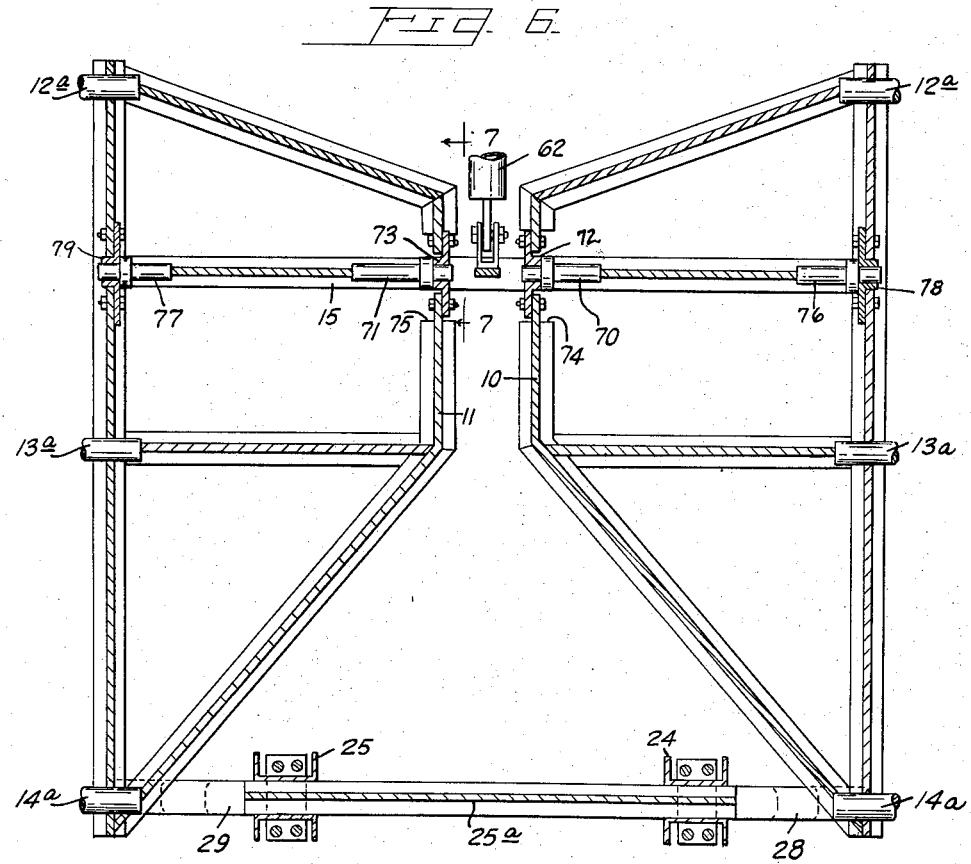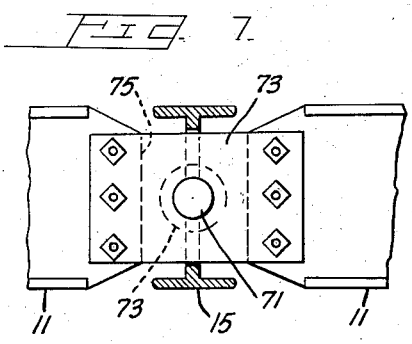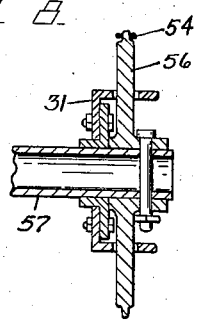

Patented Oct. 6, 1953

2,654,207

UNITED STATES PATENT OFFICE 2,654,207

COMBINE HAVING SIDE HILL PLATFORM ADJUSTMENTS

Melvin Long, Dayton, Wash.

Application February 5, 1951, Serial No. 209,479

20 Claims. (Cl. 56—209)

1

The present invention relates to improvements in a combine having side hill platform adjustments.

A combine harvester embodies a crop cutting mechanism such as a header and a threshing mechanism to which the cut crop is elevated from the header. The harvester must travel over the ground and in many cases the ground is far from level. In order for the threshing machine to operate properly it must be maintained reasonably level, that is, it needs to be prevented from tipping on a longitudinal axis although a reasonable amount of tipping about a transverse axis is not a serious disadvantage. The header, in order to cut the crop properly, should be able to follow the contour of the ground.

It is the purpose of my invention to provide a novel support mechanism for a harvester or header unit and a thresher unit wherein the thresher can be rocked about a longitudinal axis with respect to the supporting vehicle and thus kept substantially level even though the vehicle is traveling along a steep slope, and the header is supported in such a fashion as to follow the slope of the ground, the delivery conveyor between the units being kept in the same lateral and vertical position with respect to the outlet of the header and the inlet of the thresher at all times.

More particularly it is a purpose of my invention to provide a novel support mechanism for the thresher and header of a combine harvester that permits the header to move up and down with respect to the thresher and allows the header and thresher to be at different angles with respect to a horizontal plane and keeps the discharge end of the conveyor from moving up and down or sidewise with respect to the inlet end of the thresher.

It is a further object of my invention to provide a novel connection between the header unit and the inlet end of a thresher unit in a combine harvester in which the conveyor between the units is rotatably mounted on the one unit by a ring affixed to that unit and a conveyor support rotatably supported by the ring, the conveyor support having pivots for the delivery end of the conveyor.

It is a further purpose of my invention to provide a novel support mechanism for the header and thresher of a combine harvester wherein the vehicle wheels support an articulated framework that includes a transverse support for the front end of the thresher that is pivoted with respect to both sets of wheels and this transverse support mounts the front end of the thresher for rotation about a longitudinal axis and carries the header

2 in front of it, the delivery spout of the header being pivoted in a supporting member that is rotatable in the front end of the thresher.

Other detailed objects and advantages of my invention will appear from the following description and the accompanying drawings wherein a preferred embodiment of the invention is shown. It should be understood, however, that the drawings and description are illustrative only and are not intended to limit the invention except insofar as it is limited by the claims.

In the drawings:

Figure 1 is a view in side elevation with parts broken away and in section of my improved support mechanism for combine harvesters, a portion of the thresher and of the delivery spout of the header being shown;

Figure 2 is a fragmentary plan view of the front end of a combine harvester embodying my invention, the header and conveyor being shown in operative relation to the front end of the thresher;

Figure 3 is a sectional view with parts broken away taken substantially on the line 3—3 of Figure 2;

Figure 4 is a transverse sectional view with parts broken away taken substantially on the line 4—4 of Figure 3;

Figure 5 is a fragmentary sectional view taken substantially on the line 5—5 of Figure 1, certain parts of the mechanism being left out for the sake of clearness;

Figure 6 is a fragmentary sectional view taken on the line 6—6 of Figure 4;

Figure 7 is a fragmentary sectional view on a large scale taken on the line 7—7 of Figure 6;

Figure 8 is an enlarged fragmentary detailed view of a portion of the header balancing and supporting mechanism; and Figure 9 is a fragmentary sectional view taken on the line 9—9 of Figure 1.

Referring now in detail to the drawings and particularly to Figures 1 and 6, my invention is embodied in a supporting mechanism for combine harvesters wherein two lower frame members 10 and 11 are assembled to form a vehicle framework supported by wheels 12, 13, and 14 on axles 12a, 13a and 14a. I have shown the frames 10 and 11 as each being supported by three wheels; however, any other supporting means of the known types can be used for supporting the frames 10 and 11 and moving them over the ground. The frames 10 and 11 preferably are made of I-beams and are connected together by a cross beam 15. The cross beam 15 is pivoted to both frames 10 and 11 so that it may rotate about an axis that is transverse to the direction of travel.

The cross beam 15 supports a large ring 16 which serves to mount a cradle 17 for the front end of a thresher unit having a longitudinal body 18. A header or harvester platform unit 19 is positioned in front of the frames 10 and 11 and has a conveyor housing 20 that extends up to the front end of the thresher body 18. The conveyor housing 20 has a conveyor means 21 therein for conveying the cut crops from the header into the front end of the thresher. The rear portion of the thresher is supported by a second cradle 22 which is mounted on a semicircular support 23 that is in turn carried by two posts 24 and 25 and a cross beam 25a. The posts 24 and 25 are carried by the rear ends of the frame members 10 and 11 in such a fashion that a certain amount of vertical movement of the posts with respect to the frame members 10 and 11 is provided. Upper springs 26 and 27 and lower springs 28 and 29 serve to connect the posts 24 and 25 and the beam 25a to the frame beams 10 and 11.

In order that the thresher may be adequately supported by the ring 16 and the semicircular member 23, the posts 24 and 25 are suitably braced on both sides by braces 30 and 31 that extend forwardly from the posts to the ring 16. The upper braces 31 are welded to the ring 16 and the lower braces 30 are secured to the ring 16 and to the cross beam 15.

As best shown by Figures 1 and 3, the front end of the thresher body 18 is of cylindrical construction having contiguous portions 18a transverse to the length of the body and comprising crop-receiving means defining a forwardly facing inlet opening 18b. The body 18 carries, by means of the upright wall structure just described, swivel joint means in the form of a supporting element or ring 32 which rotatably mounts a juxtaposed plate element or member 33 for supporting the rear end of the housing 20 that leads from the header up to the thresher. The rear portion of the header has crop-delivery means 19a including upright and transverse portions 19b and 19c that define a rearwardly facing crop-outlet opening 19d with which the forward end of the conveyor 21 communicates in crop-transfer relationship. Since the conveyor housing is of trough-like construction, its rear end defines a rearwardly facing opening 20a in register with the thresher body opening 18b and its front end forms a forwardly facing opening 20b in register with the rearwardly facing opening 19d in the harvester unit 19. The plate member 33 may be of any suitable construction to form a support for the housing 20 so that both the plate and the housing can rotate with respect to the supporting ring 32. In the construction shown the member 33 is a flat plate having its rim portion defining bearing means journaled in the bearing means effected by the inner periphery of the ring 32, with a lock ring 34 holding the plate in place. The plate 33 forms a closure for the opening 18b at the front end of the thresher 18 so as to prevent any of the crop falling out the forward end of the thresher. The housing 20 is pivoted to the plate 33 on a transverse axis by short coaxial pivot shafts 35 and 36 that are welded to the housing 20 and journaled in suitable bearings 37 and 38 on the plate 33. The transverse axis of the shafts 35 and 36 intersects the longitudinal or fore-and-aft axis of the ring 32 and lies substantially in the plane of the plate 33. To effectively seal the registering openings 18b and 20a, the upper and lower surfaces 39 and 40 of the housing are curved about the axis of the shafts 35 and 36 and a flexible sealing member 41 is provided around the housing 20, the sealing member being fastened to the plate 33 by rivets indicated at 42 in Figure 4 of the drawings.

The conveyor 21 is here shown as being of the usual draper belt construction and is carried on suitable rollers shown at 43 and 44. Power is supplied to one of the rollers to drive the conveyor 21, but since the details of the power mechanism form no part of the present invention, this power connection has been left off the drawings for the sake of clearness.

In the front end of the thresher body 18 a small elevator conveyor 45 is mounted to direct the crop to the cylinder 46 that begins the threshing operation. A packing member 47 having teeth 48 is mounted in the upper front portion of the thresher body 18 and is driven in the direction indicated, to aid in feeding the crop to the cylinder 46.

The ring 32, the plate 33 and the pivotal connection between the plate 33 and the housing 20 provide a support for the upper or discharge end of the housing 20 so as to keep it from moving laterally or vertically with respect to the front end of the thresher. It is necessary of course, to have the header adjustable up and down for different crop height. I provide means whereby the weight of the header is supported primarily by the brace members 31 which extend forwardly and beyond their point of connection with the ring 16. The pivot point about which the header swings up and down must be coaxial with the shafts 35 and 36 in order to avoid stress and strain on the housing 20. I provide pivot arms 49 and 50 which are pivoted on suitable shafts 51 and 52 that are provided on the brace members 31. These pivot arms extend forwardly and are integrally joined with the frame of the header 19. The shafts 51 and 52 are co-axial with the shafts 35 and 36.

The weight of the header 19 is mostly supported by two sprocket chains 53 and 54 which have their lower ends connected to the header frame. These sprocket chains are extended upwardly over two sprocket wheels 55 and 56 that are fixed on a cross shaft 57 that is journaled in the forward ends of the brace members 31. Heavy coiled springs 58 and 59 are connected to the chains 53 and 54 and extend rearwardly to brackets 60 and 61 on the brace members 31. The adjustment of the header up and down is accomplished by a hydraulic lift mechanism comprising a cylinder 62 which is pivotally supported at its lower end on the cross beam 15 and a piston 63 that is pivoted to a cross brace 64 on the bottom of the housing 20. By supplying fluid under pressure to the cylinder 62 the entire header mechanism can be lifted to the desired level. The header will be prevented from twisting or sagging at either corner by the chains 53 and 54 since these chains must move in unison because they are carried on the sprockets 55 and 56 which are both fixed on the shaft 57. The shaft 57 is made large enough and strong enough so that it will not twist under the load of either side of the header enough to seriously disalign the header mechanism.

The details of the header mechanism are shown only diagrammatically. They comprise a reel 65, a cutter mechanism 66 and screw conveyors 67—68 to carry the cut crop to the center of the header crop-delivery outlet 19d where it is moved onto the conveyor 21 by the intermediate blades 69 of the screw conveyor. The details of the header mechanism are well known and form no part of the present invention.

The purpose of mounting the cross beam 15 pivotally with respect to the frames 10 and 11 is to allow a limited amount of adjustment of either frame 10 or 11 with respect to the other so that the wheels 12, 13 and 14 may better follow the ground contour. As illustrated best in Figures 6 and 7, the beam 15 has its web cut out adjacent the center and is provided with shafts 70 and 71 to receive bearing members 72 and 73 that are supported by the frames 10 and 11. The frames 10 and 11 are cut away as indicated at 74 and 75 so that the bearing members 72 and 73 can be bolted in place as shown. The ends of the beam 15 are provided with short shafts 76 and 77 that are journaled in bearings 78 and 79 that are provided on the outer portions of the frame members 10 and 11.

Any suitable means may be utilized for keeping the thresher body 18 level when the supporting framework consisting of the frames 10 and 11 and the cross frame 15 is on a slope so that one side of the machine is higher than the other. I prefer to use a hydraulic cylinder 80 and a piston 81 for this purpose. The cylinder is mounted on the brace member 30 at one side of the thresher and the piston 81 is connected to an arm 82 that is fixed to the shell of the thresher body 18. The cylinder 80 is double acting so that hydraulic fluid may be supplied to either end thereof.

It is believed that the nature and advantages of my invention will be apparent from the foregoing description. This support mechanism provides a means of keeping the header and conveyor means in proper position to feed the cut crop into the threshing cylinder even though the header may be at a considerable angle to the horizontal and the thresher itself kept level. The upright turntable resulting from the provision of the ring 32 and the mounting of the header and housing to rotate within this ring as the thresher is traveling, is a simple and effective means of accomplishing this purpose. The support mechanism provides the further necessary elements to allow the header to be raised and lowered without disturbing the header-to-thresher connection. Pivoting of the header so it must swing about the shafts 51 and 52, which are co-axial with the shafts 35 and 36, insures the freedom of adjustment of the header. The beam 15 and the springs 26—29 provide a mechanism by which the uneven contour of the ground is accommodated while the thresher and header supporting members such as the ring 16, the posts 24 and 25 and the brace members 31, hold the rings 16 and 32, and the semicircular support 23 rigidly aligned so that the thresher and header may be free of the twists and strains that uneven ground contour would otherwise cause.

Having thus described my invention, I claim:

1. In a harvester: ground-engaging means adapted to advance over a field; a thresher unit carried by the ground-engaging means for advance therewith and for lateral tilting adjustment relative to the ground, and having crop-receiving means including a forwardly facing opening; a harvester unit movable forwardly with the thresher unit and ground-engaging means and including crop-delivery means having a rearwardly facing opening in register with the thresher unit opening; and swivel joint means juxtaposed relative to the registering openings and interconnecting the units for relative angular movement about a fore-and-aft axis extending through and surrounded by the registering openings.

2. The invention defined in claim 1, in which: the swivel joint means also includes a pivot on a transverse axis providing for vertical hinging movement of one unit relative to the other.

3. In a hillside-type harvester including a body having a forwardly facing opening, a harvester platform ahead of the body and having a rearwardly facing opening and conveyor means extending from the platform opening toward and having its rear end in register with the body opening, the improvement comprising: a swivel joint between the conveyor means and the body including a pair of coaxial interengageable circular members in juxtaposed relation to the body opening and encircling the rear end of the conveyor means and mounted respectively on the body and the conveyor means and turnable relative to each other about the axis of the members.

4. In a hillside-type harvester including a body having an opening in the front end to receive harvested crops, a harvester platform ahead of the body and conveyor means extending from the platform toward and having its rear end in register with the body opening, the improvement comprising: a swivel joint between the conveyor means and the body including arcuate track means mounted on the front end of the body about the crop-receiving opening; a closure member juxtaposed over the opening and having a peripheral edge supported on the track means for angular movement relative thereto, said closure member having a crop-passing opening therein in register with the body opening and the conveyor means; and means interconnecting the conveyor means and the closure member to provide for angular movement of the platform, conveyor means and closure member as a unit relative to the body.

5. In a hillside-type harvester including a thresher unit having a forwardly facing opening, a harvesting unit ahead of the thresher unit and having a rearwardly facing opening, and conveyor means connected at one end to one unit in crop-transfer relation to the opening in that one unit and having its other end adjacent to the other unit and in crop-transfer relation to the opening in that other unit for transferring crops from the harvesting unit to the thresher unit, the improvement comprising: a swivel joint at said other end of the conveyor means for connecting the conveyor means to the adjacent unit, said joint including a pair of joint elements mounted respectively on the conveyor means and said adjacent unit and having interengaging arcuate bearing portions embracing the conveyor means and providing for relative angular movement of the conveyor means and the adjacent unit about a fore-and-aft extending axis.

6. The invention defined in claim 5, including the further provision of supporting wheels; means mounting the thresher unit on the wheels, said mounting means providing for lateral tilting of the thresher unit relative to the surface of the ground; and means connecting the harvesting unit with the mounting means for maintaining the harvesting unit generally parallel to the surface of the ground during said lateral tilting of the thresher unit.

7. In a hillside-type harvester including a body having a forwardly facing opening; a harvester platform across the front of the body, conveyor means extending from the platform toward and having its rear end in register with the body opening, supporting wheels for the body, and means connecting the wheels with the body and providing for lateral tilting of the body to permit leveling the body when the harvester is on a hillside, the improvement comprising: a swivel joint between the body and the conveyor means including a pair of coaxial interengageable circular members in juxtaposed relation to the body opening and encircling the rear end of the conveyor means and mounted respectively on the body and the conveyor means and turnable relative to each other about the axis of the members; and means connecting the harvester platform with the wheel and body connecting means and providing for maintaining the platform generally parallel with the ground while the body is tilted laterally.

8. In a hillside-type harvester including a body having a forwardly facing opening; a harvester platform across the front of the body, conveyor means extending from the platform toward and having its rear end in register with the body opening, supporting wheels for the body, and means connecting the wheels with the body and providing for lateral tilting of the body to permit leveling the body when the harvester is on a hillside, the improvement comprising: a swivel joint between the body and the conveyor means including arcuate track means mounted on the front end of the body about the opening; a closure member juxtaposed over the opening and having a peripheral edge supported on the track means for angular movement relative thereto, said closure member having a crop-passing opening therein in register with the body opening and the conveyor means; and means connecting the harvester platform with the wheel and body connecting means and providing for maintaining the platform generally parallel with the ground while the body is tilted laterally.

9. In a hillside combine including a thresher unit having a longitudinal body adapted to operate in a level position on a side hill and provided with crop-receiving means including portions defining a forwardly facing crop-inlet opening, and a harvester unit adapted to operate on a side hill adjacent to the thresher unit and having crop-delivery means including portions adjoining the aforesaid portions and defining a crop-outlet opening in register with the crop-inlet opening, the improvement residing in means for articulately interconnecting the units to accommodate differences in angularity therebetween according to different side hill slopes, comprising: first and second support elements interjournaled for relative angular movement and positionable at the junction of the crop-delivery and crop-receiving portions in juxtaposition to the crop-inlet and crop-outlet openings with the journaling axis extending longitudinally through the openings and within the confines of the opening-defining portions; means on the support elements for respectively affixing said elements to the units so that the aforesaid articulation of the units occurs about the aforesaid journaling axis to retain registry of the openings; the first support element having an open interior in register with the openings to enable the passage of crops therethrough from the crop-delivery means to the crop-receiving means and having bearing means outside said open interior and arranged to lie on at least part of a circle about the journaling axis; and the second support having bearing means outside said open interior of the first support element and concentrically cooperative with the first support element bearing means to carry one support element on the other for achieving the aforesaid relative angular movement.

10. The invention defined in claim 9, in which: the first support element is a plate-like member and its open interior is effected by an opening therein for register with the crop-outlet and crop-inlet openings; said member has arcuate peripheral edge portions forming said first bearing means; and the second bearing means comprises arcuate portions embracing the arcuate edge portions of the first support element.

11. The invention defined in claim 10, in which: the plate-like member is circular to establish said arcuate edge portions; and the second support element is in the form of a ring concentric with and encircling the circular member to establish said second bearing means.

12. In a hillside combine including a thresher unit having a longitudinal body adapted to operate in a level position on a side hill and provided with crop-receiving means including portions defining a forwardly facing crop-inlet opening, and a harvester unit adapted to operate on a side hill adjacent to the thresher unit and having crop-delivery means including portions adjoining the aforesaid portions and defining a crop-outlet opening in register with the crop-inlet opening, the improvement residing in means for articulately interconnecting the units to accommodate differences in angularity therebetween according to different side hill slopes, comprising: first and second support elements interjournaled for relative angular movement and positionable at the junction of the crop-delivery and crop-receiving portions in juxtaposition to the crop-inlet and crop-delivery openings with the journaling axis extending longitudinally through the openings and within the confines of the opening-defining portions; means on the support elements for respectively affixing said elements to the units so that the aforesaid articulation of the units occurs about the aforesaid journaling axis to retain registry of the openings and said support elements being so shaped and dimensioned relative to each other and to the openings as to be traversed by crops moving from the crop-delivery means to the crop-receiving means via the openings.

13. Swivel joint means for articulately interconnecting the harvester and thresher units of a combine of the type in which the harvester unit has crop-transfer means defining an opening through which crops are fed along a crop-transfer path through an adjoining and registering opening in crop-receiving means of the thresher unit, comprising: first and second juxtaposed support elements interjournaled for relative angular movement and positionable at the junction of and in juxtaposed relation to the openings and transversely of the crop-transfer path, with the journaling axis within the openings and lying along the crop-transfer path; means on the support elements for respectively affixing said elements to the units so that articulation of the units occurs about the aforesaid journaling axis to retain registry of the openings; and the support elements being so shaped and dimensioned relative to each other and to the crop-transfer area of the registered openings as to enable crops moving along the crop-transfer path to traverse said elements and pass through the openings.

14. The invention defined in claim 13, in which: the first support element has a crop-transfer aperture therethrough for register with the unit openings and bearing portions thereon radially outwardly of the aperture and arranged to lie on at least part of a circle about the journaling axis; and the second support element has bearing portions also radially outwardly of said aperture and concentrically engaging the first support element bearing portions.

15. The invention defined in claim 14, in which: the first support element is in the form of a circular apertured plate-like member, the peripheral edge portions of which establish the first bearing portions; and the second support element is in the form of a ring, the inner periphery of which establishes the second bearing portions.

16. Swivel joint means for articulately interconnecting the harvester and thresher units of a combine of the type in which the units have adjoining and registering openings and a crop-conveyor in one unit having a portion proximate to the openings for moving crops through the openings from the harvester unit to the thresher unit, comprising: first and second juxtaposed support elements interjournaled for relative angular movement and positionable at the junction of and in juxtaposed relation to the openings and transversely of the crop-conveyor, with the journaling axis within the openings and lying lengthwise of the crop-conveyor; means on the support elements for respectively affixing said elements to the units so that articulation of the units occurs about the aforesaid journaling axis to retain registry of the openings; the support elements being so shaped and dimensioned relative to each other and to the crop-transfer area of the registered openings as to enable the crop-conveyor to move crops past said elements and through the openings; and means on one of the support elements for carrying the opening-proximate portion of the crop-conveyor.

17. In a harvester: ground-engaging means adapted to advance over a field; a thresher unit carried by the ground-engaging means for advance therewith and for lateral tilting relative to the ground and having a forwardly directed crop-receiving opening; a harvester unit positioned closely ahead of the thresher unit and interconnected with the ground-engaging means and thresher unit for advance therewith and having a rearwardly directed crop-delivery opening in fore-and-aft alinement with the thresher unit opening; conveyor means extending between the units in fore-and-aft alinement with the openings for conveying crops from the harvester unit to the thresher unit via said openings; first means connecting the conveyor means at one end to one unit; and second means connecting the conveyor means at its other end to the other unit and including joint elements mounted respectively on said other end of the conveyor means and on said other unit for relative angular movement about a fore-and-aft axis surrounded by the opening in said other unit and providing for angular movement of one unit and the conveyor means relative to the other unit about said fore-and-aft axis.

18. The invention defined in claim 17, in which: the second joint means includes cooperative parts forming a pivot on a transverse horizontal axis intersecting the fore-and-aft axis and providing for hinging the conveyor means on said other unit about said transverse axis.

19. In a harvester: ground-engaging means adapted to advance over a field; a thresher unit carried by the ground-engaging means for advance therewith and for lateral tilting relative to the ground about a fore-and-aft axis and having a forwardly directed crop-receiving opening coaxial with said tilting axis; a harvester unit positioned closely ahead of the thresher unit and interconnected with the ground-engaging means and thresher unit for advance therewith and having a rearwardly directed crop-delivery opening in fore-and-aft alinement with the thresher unit opening; conveyor means extending between the units in fore-and-aft alinement with the openings for conveying crops from the harvester unit to the thresher unit via said openings; first means connecting the conveyor means at one end to the harvester unit; and second means connecting the conveyor means at its other end to the thresher unit and including joint elements mounted respectively on said other end of the conveyor means and on the thresher unit for relative angular movement about a fore-and-aft axis coaxial with the aforesaid fore-and-aft tilting axis and providing for angular movement of the harvester unit and the conveyor means relative to the thresher unit about said fore-and-aft axis.

20. The invention defined in claim 19, in which: a first upright transverse ring supports the thresher unit on the ground-engaging means for tilting about said fore-and-aft tilting axis; and one of the elements of said second means comprises a second upright transverse ring coaxial with the first ring.

MELVIN LONG.

References Cited in the file of this patent

UNITED STATES PATENTS

| Number | Name | Date |
|---|---|---|
| 700,102 | Thompson | May 15, 1902 |
| 1,269,522 | Breneman | June 11, 1918 |
| 1,972,407 | Morse | Sept. 4, 1934 |
| 2,251,655 | Bostic | Aug. 5, 1941 |
| 2,488,592 | Hamilton et al. | Nov. 22, 1949 |
| 2,504,289 | Waterman | Apr. 18, 1950 |
| 2,513,111 | Schiller | June 27, 1950 |